United States Patent [19]
Bremer et al.

[11] Patent Number: 5,537,441
[45] Date of Patent: Jul. 16, 1996

[54] CONTROLLED SIMULTANEOUS ANALOG AND DIGITAL COMMUNICATION

[75] Inventors: Gordon Bremer, Clearwater; Joseph Q. Chapman, Largo; P. Michael Henderson, Largo; Kurt E. Holmquist, Largo; Kenneth D. Ko, Clearwater; Richard K. Smith, Seminole, all of Fla.

[73] Assignee: AT&T Corp., Murray Hill, N.J.

[21] Appl. No.: 67,519

[22] Filed: Jun. 14, 1993

[51] Int. Cl.$^6$ .................................................. H04L 5/12
[52] U.S. Cl. ........................... 375/261; 375/222; 379/93; 370/20
[58] Field of Search .................... 375/8, 5, 38, 39; 379/93, 97, 98, 99; 370/20

[56] References Cited

U.S. PATENT DOCUMENTS

| | | | |
|---|---|---|---|
| 4,512,013 | 4/1985 | Nash | 370/69.1 |
| 4,546,212 | 10/1985 | Crowder, Sr. | 179/2 C |
| 4,672,602 | 6/1987 | Hargrave et al. | 370/58 |
| 4,757,495 | 7/1988 | Decker et al. | 370/76 |
| 4,851,806 | 1/1990 | Farias et al. | 375/39 |
| 4,924,516 | 5/1990 | Bremer et al. | 380/46 |
| 5,081,647 | 1/1992 | Bremer | 375/5 |
| 5,103,227 | 4/1992 | Betts | 341/61 |
| 5,151,972 | 9/1992 | Lorenz et al. | 379/93 |
| 5,243,629 | 9/1993 | Wei | 375/38 |

OTHER PUBLICATIONS

"Adaptive Equalization and Phase Tracking for Simultaneous Analog/Digital Data Transmission," *The Bell System Technical Journal*, vol. 60, No. 9, Nov. 1981, by T. L. Lim and M. S. Mueller, pp. 2039–2063.

"High Speed Digital and Analog Parallel Transmission Technique Over Single Telephone Channel", *IEEE Transactions on Communications*, vol. COM–30, No. 5, May 1982, by F. Akashi, Y. Sato and M. Eguchi, pp. 1213–1218.

"Simultaneous Transmission of Speech and Data Using Code–Breaking Techniques", *The Bell System Technical Journal*, vol. 60, No. 9, Nov. 1981, by R. Steele and D. Vitello, pp. 2081–2105.

"Adaptive Noise Cancelling: Principles and Applications", *Proceedings of the IEEE*, vol. 63, No. 12, Dec. 1975, by B. Widrow et al, pp. 1692–1716.

"An Integrated Digital Subscribers Speech and Data Service", *ICC Conf. Rec.*, vol. 3, Seattle, Washington, Jun. 8–12, 1980, by L. J. Stagg and D. Clothier, pp. 39.6.1–39.6.6.

"Frequency Domain Data Transmission using Reduced Computational Complexity algorithms", *ICASSP 80 Proc.*, Denver, Colorado, vol. 1, Apr. 9–11, 1980, by A. Peled and A. Ruiz, pp. 964–967.

(List continued on next page.)

*Primary Examiner*—Stephen Chin
*Assistant Examiner*—T. Ghebretinsae
*Attorney, Agent, or Firm*—Henry T. Brendzel

[57] ABSTRACT

A method and apparatus for control of concurrent communication of analog information and digital information. In general terms, when the communication channel is viewed as a multi-dimensional space, the digital information signal is divided into symbols, and the symbols are mapped onto the signal space with a preset distance between them. The analog signal, generally limited in magnitude to less than half the distance separating the symbols, is converted to component signals and added (i.e., vector addition) to the symbols. The sum signal is then transmitted to the receiver where the symbols are detected and subtracted from the received signal to yield the analog signal components. The transmitted analog signal is recreated from those components. Both half-duplex and full-duplex operation is available in accordance with this invention. The illustrative embodiment includes a controller that is sensitive to input signals applied to the modem disclosed herein. To wit, the control is sensitive to signals from the analog port, signals from the digital port, and signals from the port that carries the combined digital and analog signals. Operation of the near-end modem is controlled as well as operation of the far-end modem.

9 Claims, 10 Drawing Sheets

OTHER PUBLICATIONS

"Speech–band data modems", *Electronics & Power*, vol. 26, No. 9, by P. F. Adams, pp. 733–736.

"Speech and Data Transmission in ACS Telephone Channels", *Telecommunication & Radio Eng.*, vol. 30/31, Jul. 1976, by V. E. Bukhviner, pp. 66–70.

"Method for superimposing Data on Amplitude–Modulated Signals", *Electronics Letters*, vol. 18, No. 9, Apr. 29, 1982, by Lockhart et al pp. 379–381.

"A New Generation of Speech Plus Data Multiplexer", *Conference on Communications and Equipment and Systems*, Birmingham, England, Apr. 4–7, 1978, by N. N. Y. Shum et al, pp. 111–113.

CONTROLLED SIMULTANEOUS ANALOG AND DIGITAL COMMUNICATION

RELATED APPLICATION

This application is related to an application titled SIMULTANEOUS ANALOG AND DIGITAL COMMUNICATION, filed on even date hereof.

FIELD OF THE INVENTION

This invention relates to simultaneous transmission of analog and digital signals and, more particularly, to controlled simultaneous transmission of analog signals and digital signals in a non-multiplexed manner and in a generally co-extensive frequency band.

DESCRIPTION OF THE PRIOR ART

In the prior art, when voice and data is transmitted simultaneously over a channel, it is typically transmitted either via frequency-division multiplexing or time-division multiplexing. In frequency-division multiplexing, the data channel and the voice channel are allocated different sub-bands of the channel's bandwidth. Examples of that are U.S. Pat. No. 4,757,495, U.S. Pat. No. 4,672,602, and U.S. Pat. No. 4,546,212. In time-division multiplexing arrangements, voice signals are sampled, digitized and interleaved with digital data to form a single information stream which is communicated over the available channel. Practically every digital carrier system (e.g. the T1 carrier system) is an example of that.

U.S. Pat. No. 4,512,013, issued Apr. 16, 1985, presents an interesting approach that is close to a frequency division multiplexing arrangement for simultaneous voice and data. The arrangement filters the speech signal and adds thereto a modulated narrowband signal to form the transmitted signal. The narrowband modulated signal derives from a narrow-band digital input signal that is modulated with a carrier, thereby shifting the narrow-band up in frequency to a position in the spectrum where there is little speech energy. At the receiver, in reliance of the fact that the speech power is low in the narrowband occupied by the modulated digital signal, the digital signal is recovered through appropriate demodulation. Thereafter, the recovered digital signal is remodulated to replicate the transmitter's operation, adaptively filtered to account for channel characteristics, and subtracted from the received signal. The result is the received speech. As indicated above, one salient characteristic of that arrangement, as stated in col. 2, lines 13–18, is that "... an entire analog speech signal and a modulated data signal are capable of being transmitted over a normal analog channel by the multiplexing of the data signal within the portion of the normal analog speech signal frequency band where the speech signal is present and the power density characteristic thereof is low". As an aside, the U.S. Pat. No. 4,517,013 arrangement is half duplex.

In the modem art, digital information is communicated over a channel by converting the digital information to analog form. In the most basic form, a modem filters the digital signal (i.e., shifts it in frequency) to form a band-limited signal and modulates that signal to reside within the passband of the communication channel. In telephony, for example, that passband may be between 300 Hz and 3500 Hz. To increase the information-carrying capacity of the modulated signal, more sophisticated modems employ quadrature modulation. Quadrature modulation is often depicted as a two-dimensional signal space. Use of the signal space to send voice information is disclosed in U.S. Pat. No. 5,981,647 issued Jan. 14, 1992.

Use of the signal space to send data and voice is described in "High Speed Digital and Analog Parallel Transmission Technique Over Single Telephone Channel", Akashi et al, IEEE Transactions on Communications, Vol. 30, No. 5, May, 1982, pp. 1213–1218. Unlike prior techniques, where analog and data were segregated into different time slots (TDM) or different frequency bands (FDM), they describe separating analog and data signals into the two different channels of the QAM system. That is, Akashi et al suggest modulating the in-phase channel with the analog signal, and modulating the quadrature channel with the data signal. Building on that description and concerning themselves with channel equalization, Lim et al analyze equalizer performance in "Adaptive Equalization and Phase Tracking For Simultaneous Analog/Digital Data Transmission", BSTJ, Vol. 60 No. 9, Nov. 1981, pp. 2039–2063. (The 1981BSTJ article cites the information of 1982 IEEE article as "unpublished work").

No one has achieved the ability to simultaneously send both data and voice through both channels of a QAM system, and no one has achieved the ability to communicate both by data and analog, simultaneously, and in full-duplex, over a single bi-directional bandlimited communications channel.

SUMMARY OF THE INVENTION

Analog information and digital information is communicated concurrently when employing the principles of this invention. In general terms, when the communication channel is viewed as a multi-dimensional space, the digital signal is divided into symbols, and the symbols are mapped onto the signal space with a preset distance between them. The analog signal, generally limited in magnitude to less than half the distance separating the symbols, is converted to component signals and added (i.e., vector addition) to the symbols. The sum signal is then transmitted to the receiver where the symbols are detected and subtracted from the received signal to yield the analog signal components. The transmitted analog signal is recreated from those components.

In one illustrative embodiment, the digital stream entering the transmitter section is divided into words, and each word is mapped to a pair of symbol components. The analog signal entering the transmitter section is sampled and each pair of successive samples forms a set of analog vector components. The analog vector components are added, respectively, to the symbol components and the component sums are QAM modulated to form the output signal. The pairs of analog samples can be derived by simply delaying the analog signal and sampling both the delayed and the undelayed versions.

At the receiver, the signal is first demodulated and the digital signal is detected in accord with standard modulation technology. The detected digital signal is then subtracted from the received signal to form analog samples pairs that are combined to reconstitute the analog signal.

The illustrative embodiment includes control means that is sensitive to input signals applied to the modem disclosed herein. That includes signals from the analog port, input signals from the digital port, and input signals from the port that carries the combined digital and analog signals. The control means controls operation of the near-end modem and also sends signals to the far-end modem.

DETAILED DESCRIPTION

Figure 1:
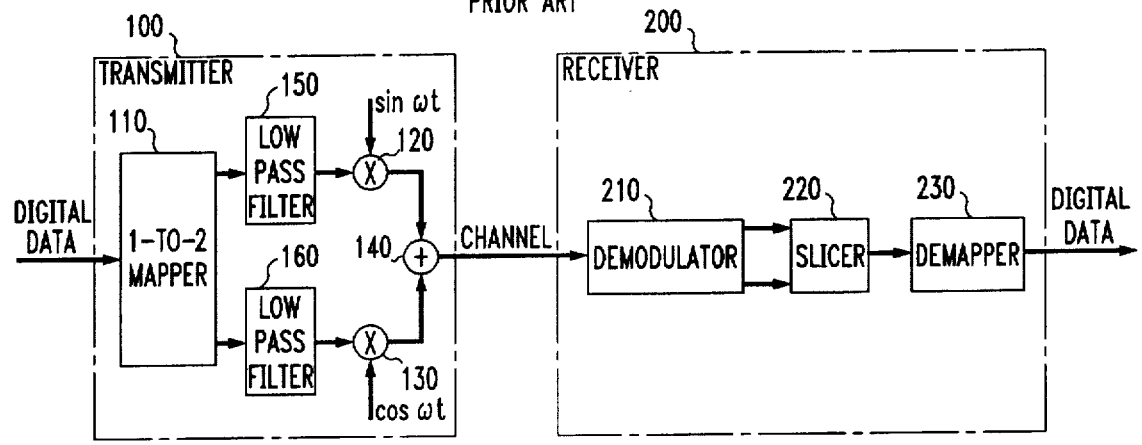
FIG. 1 presents the basic structure of a prior art modem.

To place this disclosure in context, FIG. 1 presents a very basic block diagram of a modem that communicates digital data via quadrature modulation techniques. Section 100 is the modem's transmitter section and section 200 is the modem's receiver section. Specifically, in the transmitter section digital data is applied in FIG. 1 to a 1-to -2 mapper 110, and mapper 110 develops two outputs which typically are referred to as the in-phase and quadrature samples. The in-phase samples are applied via low pass filter 150 to modulator 120, which multiplies the applied signal by a carrier—i.e., sin ω t in FIG. 1. The quadrature samples are applied via low pass filter 160 to modulator 130, which multiplies the applied signal by a second carrier. The second carrier is orthogonal to the first carrier; namely, cos ω t. Filters 150 and 160 must be bandlimited to no more than co, in order to avoid aliasing and to at least half the inverse of the output sample rate of mapper 110. The output signals of modulators 120 and 130 are added in element 140 to develop the analog signal of the modem's transmitter section.

In operation, the digital data applied to the FIG. 1 apparatus is a stream of bits. Element 110 views the incoming signal as a stream of symbols that each comprises a preselected number of consecutive bits, and maps each symbol into an in-phase analog sample and a quadrature analog sample.

Figure 2:
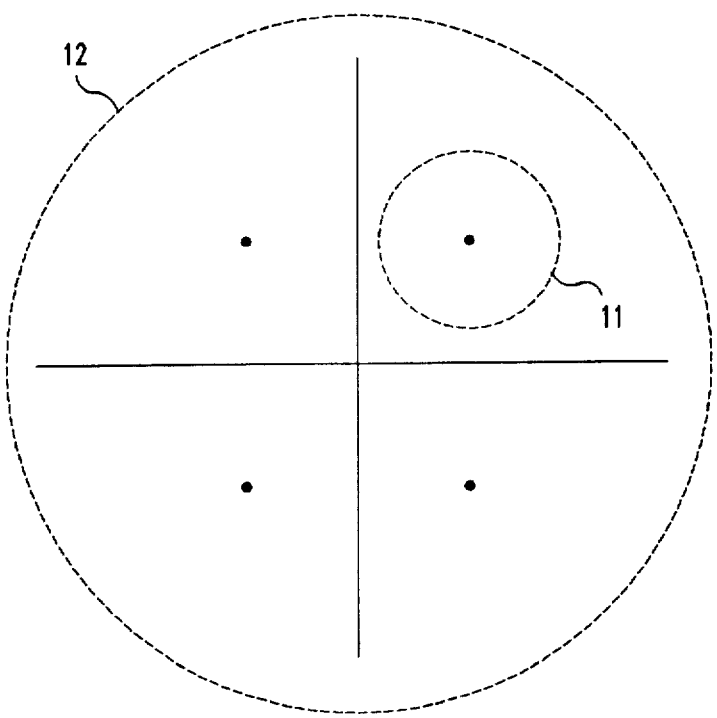
FIG. 2 shows the signal space and an illustrative signal constellation for the FIG. 1 system.

Practitioners in the art often describe the operations performed in the FIG. 1 apparatus by means of a signal space diagram, such as shown in FIG. 2. The x axis corresponds to one of the carrier signals (e.g., cos ω t) and the y axis corresponds to the other carrier signal (sin ω t). The in-phase and quadrature samples delivered by element 110, in effect, specify a location in the signal space of FIG. 2. Accordingly, the set of possible samples that element 110 can produce corresponds to a set of sample points (i.e., a constellation of points) in the signal space depiction of FIG. 2. A 4-point signal constellation is shown, by way of illustration, in FIG. 2. It is well known, however, that one can create signal point constellations with a larger number of signal points.

To receive signals that were modulated by the FIG. 1 apparatus in accordance with the specific constellation depicted in FIG. 2, one must only identify whether the received signal is in the first, second, third or fourth quadrant of the signal space. That means that there exists great latitude in the signals that are received, and any received signal that is still in the correct quadrant is mapped to the correct constellation signal point in that quadrant. Extended to other (and perhaps larger) constellations, the signal space can be divided into regions and the receiver's decision is made with respect to the region in which the received signal is located. We call these regions "neighborhood" regions.

Returning to FIG. 1 and addressing the modem's receiver section, the modulated signal is applied to demodulator 210. Demodulator 210 recovers the in-phase and quadrature components and applies them to slicer 220. Slicer 220 converts the in-phase and quadrature components into symbols and applies the symbols to de-mapper 230. De-mapper 230 maps the symbols into bit streams to form the recovered digital data stream.

Absent any signal degradation (such as due to noise added in the channel) the signal received by demodulator 210 would be precisely the same as the signal sent by adder 140, and a determination of neighborhood regions in which the signal is found (by slicer 220) would be relatively simple and error-free. However, noise that is added to the transmitted signal shifts the received signal in the signal space and modifies the input to slicer 220. Stated in other words, a noise signal that adds to the signal flowing through the communication channel corresponds to a vector signal in the signal space of FIG. 2 that is added to a transmitted sample point. That added vector is of unknown magnitude and unknown phase. Consequently, added noise converts a transmitted signal that corresponds to a point in the signal space into a region in the signal space. This phenomenon is depicted in FIG. 2 by circle 11. Some refer to this circle as a signal space "noise cloud" surrounding the transmitted signal.

From the above it is clear that in order to detect the transmitted signals without errors, the neighborhood regions must be large enough to encompass the noise cloud. Since the average power of the sent signal is typically limited by other considerations, the extent to which the signal constellation covers the infinite space represented by the x and y axes is also limited. This is represented in FIG. 2 by circle 12. The restriction imposed by circle 12, coupled with the restriction on the size of the neighborhood regions that is imposed by noise considerations limits the number of transmitted signal points in the constellation.

Figure 3:
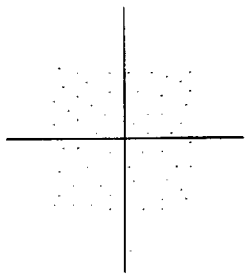
FIG. 3 shows the signal space of a QAM analog system.

As indicated above, it has been observed that in typical modem designs the allowable signal power and the expected fidelity of the channel combine to control the constellation size. Less noisy channels allow for larger constellations, and larger constellations permit higher digital data throughputs. This leads to a totally revolutionary idea of utilizing all or essentially all, of the available signal space for the transmission of information. A transmitter signal space in accordance with this revolutionary approach is depicted in FIG. 3 where a plurality of signal points are depicted randomly within the signal space. These points are illustrative of the various vectors that the transmitter is allowed to send out. There are no more "constellations of points", where a decision must be made between constellation points; them is only the entirety of the signal space. In other words, rather than having digital signals that are mapped onto a fixed constellation within a signal space, FIG. 3 depicts analog signals that are mapped onto a signal space. When the analog signals that form the in-phase component are independent of the analog signals that form the quadrature component, the viable signal space of FIG. 3 may be rectangular.

Having recognized the advantages of sending analog signals in accordance with the signal space of FIG. 3, the next innovation is to alternate between the signal spaces of FIG. 2 and FIG. 3. That is, the innovation is to send customer analog signals or customer digital signals as the need arises. This is depicted in FIG. 4.

Figure 4:
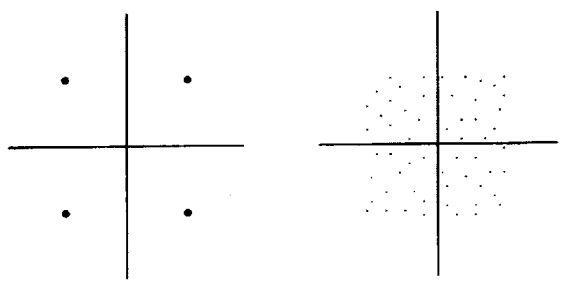
FIG. 4 shows the signal space of an alternating digital and analog system.

Further, having recognized the advantages of sending either analog or digital signals in accordance with the signal spaces of FIG. 4, it was discovered that a totally different communication approach can be taken, that communicating both analog and digital signals, can be expressed concurrently, in a combined signal space. This is illustrated in FIG. 5, where four neighborhoods are identified for illustrative purposes, with demarcation borders identified by dashed lines 21 and 22.

Figure 5:
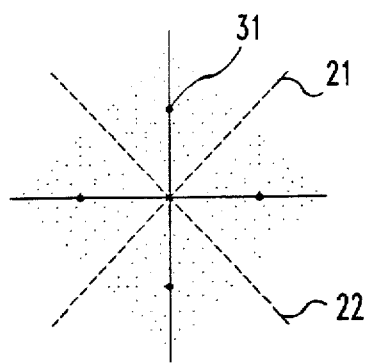
FIG. 5 shows the signal space of a combined digital and analog system.

According to the FIG. 5 depiction, the analog signals that form "signal clouds" around each digital constellation point (e.g., point 31) should be restricted in their dynamic range to be totally contained within the neighborhood regions. Hence, here too there is a trade-off between constellation size (which directly affects digital through-put) and dynamic range of the transmitted analog signal (which in some situations translates to "resolution").

Figure 6:
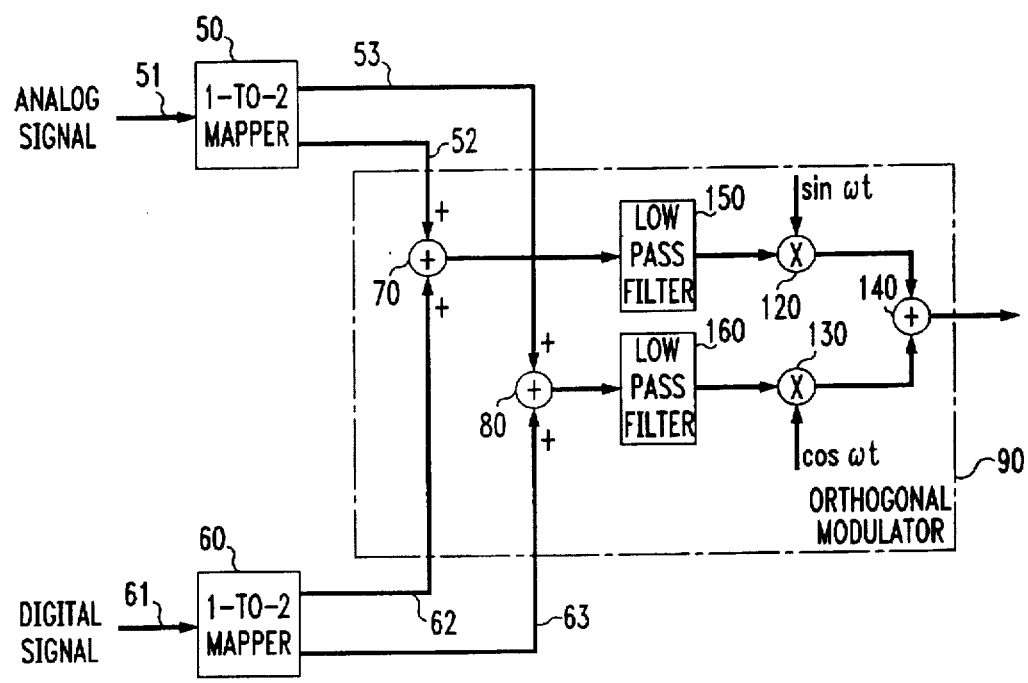
FIG. 6 presents one embodiment of a transmitter section for a combined digital and analog system.

FIG. 6 depicts an arrangement that very basically illustrates the principles disclosed herein. It includes a 1-to-2 dimensional mapper 60 responsive to digital signals applied on line 61. Mapper 60 develops two output signals on lines 62 and 63, each of which possesses pulses with quantized amplitudes that relate to the digital signals arriving on line 61. FIG. 6 also includes a 1-to-2 mapper 50 that responds to an applied analog signal on line 51, and it develops two output signals on lines 52 and 53, each of which possesses pulses with continuous amplitudes that relate to the analog signal on line 51. Outputs 52 and 62 are combined in adder 70 and outputs 53 and 63 are combined in adder 80. The outputs of adders 70 and 80 form the components of the signals that are represented by the signal space of FIG. 5. As in FIG. 1, the outputs of adders 70 and 80 are applied via low pass filters 150 and 160 to modulators 120 and 130 and summed in adder 140 to form a modulated signal as is typically known in the modem art.

In FIG. 6 element 60 is depicted as a 1-to-2 mapper. However, it should be understood that element 60 can be an M-to-N mapper. That is, element 60 can be responsive to a plurality (M) of digital signals and it can develop a different plurality (N) of output signals. Similarly, element 50 can be a J-to-K encoder that is responsive to a plurality of analog signals. Likewise, the collection of elements that follow elements 50 and 60 (i.e., elements 70, 80, 120, 130, 140, 150 and 160), which form orthogonal modulator 90 can be constructed to be responsive to whatever plurality of outputs of that elements 50 and 60 are designed to produce (e.g., three dimensional space, four dimensional space, etc.). More specifically, those elements must account for all of the applied input signals, and that means that they must be able to handle K or N signals, whichever is larger. In such a circumstance, however, the user can assume that the larger of the two (K or N) is the dimensionality of the system, and some of the dimensions have either no digital data, or no analog data, whichever applies. Of course, if there are "dimensions" for which there is no digital or analog data, other information can be sent over those dimensions, such as equalization "side" information.

Figure 7:
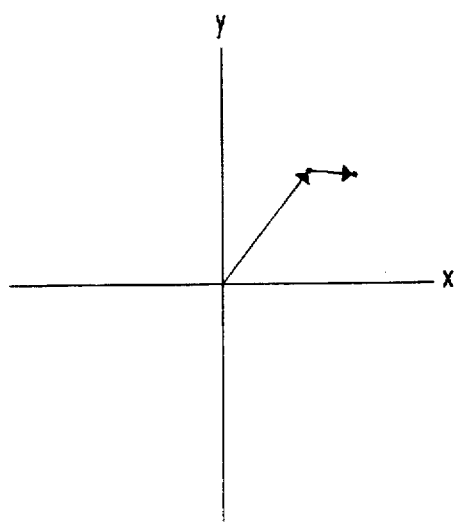
FIG. 7 depicts the vector addition that forms the signal space of FIG. 5.

In the context of a signal space, the N pluralities of output signals of elements 50 and 60 (assuming N is larger than K) correspond to the collection of components of vectors in multi-dimensional space; e.g., N-dimensional space. The coordinates of this multi-dimensional space correspond to the orthogonal modulation signals within orthogonal modulator 90. In FIG. 6, the two orthogonal modulation signals are $\cos \omega t$ and $\sin \omega t$, but other modulation signals are also possible; for example, code division multiplexing (CDMA) templates. For purposes of this disclosure, orthogonal modulation signals are modulation signals that develop a transmitted signal comprising concurrent element signals and yet allow the receiver to separate the received signal into its constituent element signals, those being the signals developed in response to each of the modulation signals. It may also be observed that, relative to FIG. 5, orthogonal modulator 90 performs vector summation of the symbol vector represented by the components developed by element 60 with the analog information vector represented by the components developed by element 50. This is depicted in FIG. 7.

Figure 8:
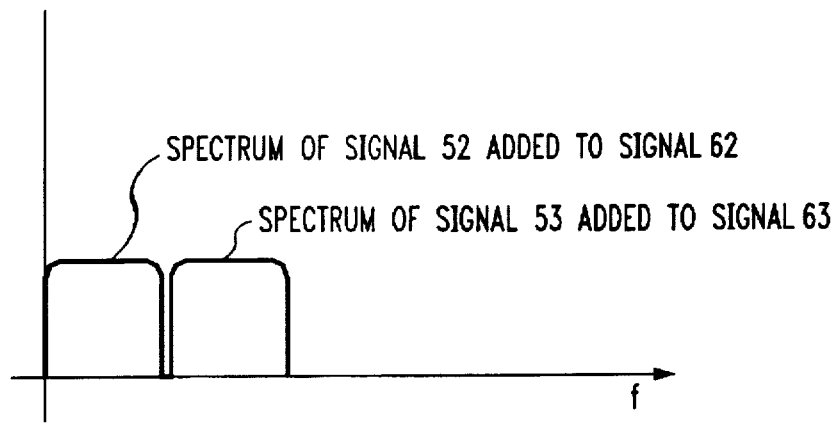
FIG. 8 presents one orthogonal modulation approach.

In connection with FIG. 1, it may be noted in passing that the principles disclosed herein may be utilized even when the output signals of adders 70 and 80 are communicated (e.g., transmitted) directly, without the benefit of combining them in orthogonal modulator 90. Also, orthogonal modulator 90 can simply be a band-shifting means. To the extent that the output of adder 70 (for example) is band-limited, the output of adder 80 can be shifted beyond the band-limited output signal of adder 70 and combined with the output signal of adder 70. This is presented in FIG. 8. It may also be appreciated that the principles disclosed herein may be exercised without the use of element 60 in those situations where no digital streams are presented.

To this point in the instant disclosure, the implication has been that the input signal applied to element 50 of FIG. 6 is analog. However, that does not have to be strictly the case. In accordance with conventional techniques, an analog signal that is bandlimited can be sampled (within the proper Nyquist bounds). Hence, it should be understood that the input signal to element 50 can be a sequence of analog samples. Moreover, a sampled analog signal can be quantized and represented in digital form. Indeed, an analog signal that has been sampled and converted to digital form can then be converted to amplitude quantized pulse amplitude-modulated format; e.g., conventional PCM. All of those representations are representations of an analog signal. For example, the collection of the amplitude-quantized PAM pulses is identical to the original analog signal within the bounds of the quantization errors introduced by the sampling and quantizing (A/D conversion followed by D/A conversion) processes.

The fact that sampling and amplitude quantization of the analog signal at the input of element 50 is permitted offers a number of benefits. For one, it allows the signal to be presented to element 50 in digital format. For another, it permits simple multiplexing of different information sources. Thus, for example, elements 50, 60 and 90 can be implemented in accordance with present day modem realizations; i.e., with one or more microprocessors operating under stored program control.

Figure 9:
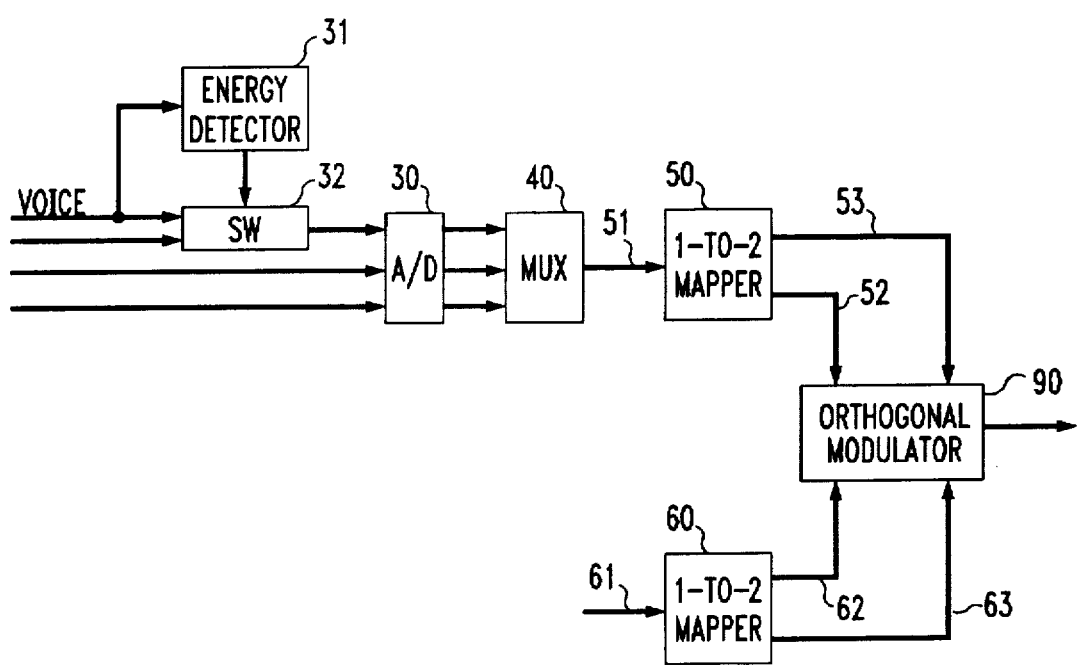
FIG. 9 illustrates the arrangements that permits more than one analog signal source to be transmitted simultaneously.

An example of input signal multiplexing is shown in FIG. 9, which presents an embodiment that includes an A/D converter bank 30 followed by a multiplexer 40. Converter bank 30 converts a plurality of analog signals, such as on lines 33 and 34, to digital format and multiplexer 40 multiplexes its input signals and applies them to element 50. Elements 30 and 40 are conventional A/D and multiplexer elements, respectively.

The combination of elements 30 and 40 allows applying a number of narrowband analog signals to orthogonal modulator 90. The primary limitations are the carrier frequency and the allowable transmission bandwidth of the channel. The narrowband signal can, of course, come from any source. For example, a system installed in an ambulance may sacrifice some voice bandwidth in order to allow narrowband telemetry data of blood pressure and heart pulse rate to be communicated concurrently with the voice.

Additionally, a voice signal energy detector may be included, such as disclosed in U.S. Pat. No. 5,08 1,647, which would detect periods of silence and send less urgent telemetry data during those silence periods. The silence periods may be naturally occurring periods, or silence periods enforced for the purpose of communicating telemetry information, such as data about the analog information just sent or about to be sent. This is illustrated by elements 31 and 32 in FIG. 9.

The fact that the input to element 50 is digital (in a digital implementation of elements 50, 60 and 90) and that the input to element 60 is also digital should not be confused. The digital input to clement 60 is a stream of digits that are each equally important. Hence, those digits are converted into symbols and the symbols into constellation points, and the constellation points are within neighborhoods which are identified by a slicer (e.g., slicer 220 in FIG. 1) within a modem's receiver section. In contradistinction, the digital signals applied to element 50 correspond to digital words that represent amplitude, and the specific interrelationship between adjacent bits of the digital words is maintained. As indicated above, being a fundamental distinction, the signal cloud around a signal point within a constellation does not represent a plurality of signal points that must be distinguished.

Figure 10:
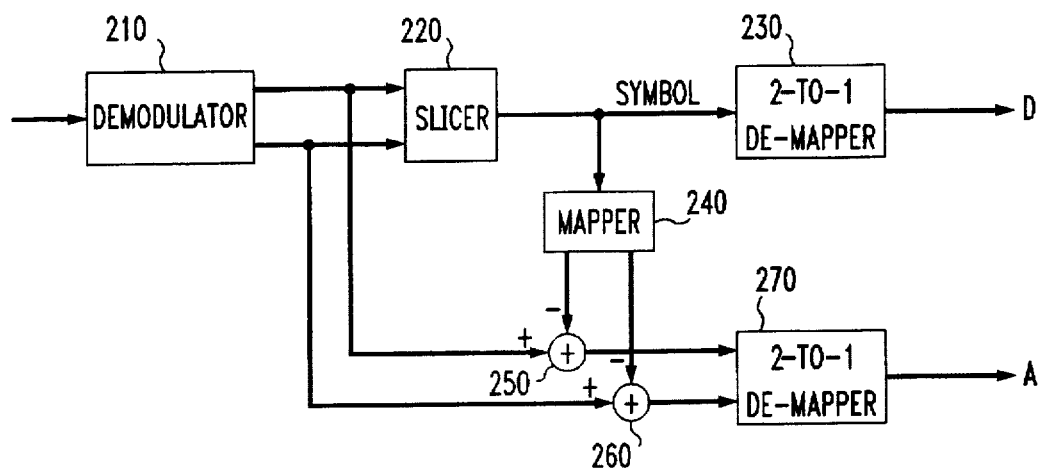
FIG. 10 details the major elements in a receiver responsive to the FIG. 5 signal space.

FIG. 10 presents a basic block diagram of a modem's receiver section in conformance with the principles disclosed herein. The modulated input signal received from the channel is applied to demodulator 210 which develops the in-phase and quadrature components. Those are applied to slicer 220 which identifies the symbols, and the symbols are applied to de-mapper 230. All this is in accord with conventional modem approaches, as described in connection with FIG. 1. In addition, FIG. 10 includes a mapper 240 that is responsive to the symbols developed by slicer 220. The output of mapper 240 is an accurate estimate of tile set of in-phase and quadrature components (that are applied in tile FIG. 1 arrangement to elements 150 and 160). The outputs of mapper 240 are subtracted from the outputs of demodulator 210 in subtractors 250 and 260. The outputs of subtractors 250 and 260 are applied to 2-to-1 de-mapper 270 which recombines the analog samples to form an estimate of the original analog signal. De-mapper 270 performs the inverse function of mapper 50.

In may be noted that slicer 220 can be designed to directly provide the output signals that mapper 240 develops; and moreover, de-mapper 230 can be made responsive to such signals. That would alter the FIG. 10 in the sense that slicer 220 and mapper 240 would combine to form a single element and de-mapper 230 as well as adders 250 and 260 would be responsive to that combined element.

In analog realizations (e.g., FIG. 6), mapper 50 is responsive to analog signals. Various approaches can be taken to develop the plurality of outputs (two outputs, in the case of element 50 shown in the Figures). For example, a single bandlimited analog signal can be divided into a plurality of baseband signals by simply filtering and modulating selected sub-bands. Alternatively, element 50 can accept a plurality of bandlimited analog signals and assign each one of the plurality of bandlimited analog signals to different outputs of element 50.

In time sampled realizations (whether the realization continues with analog circuitry or digital circuitry), element 50 can simply route alternate samples of a single analog signal to different outputs of element 50, or multiplex a plurality of analog signals and distribute the samples of those signals in any convenient manner.

In order to allow for nonlinear techniques that may be employed to enhance the communication qualities, it is important to effect equalization of the channel in order to minimize intersymbol interference. Conventional modem technology can be brought to bear to this need.

Figure 11:
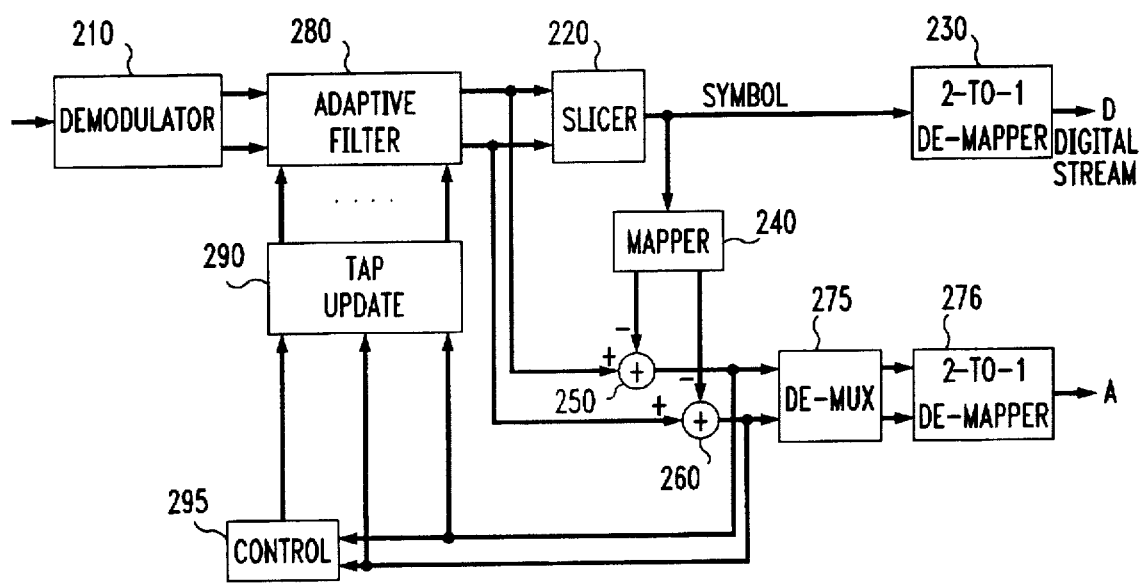
FIG. 11 presents a block diagram of a receiver that includes adaptive equalization.

FIG. 11 presents a block diagram of an arrangement that incorporates equalization. Specifically, FIG. 11 is depicted with a modulator that is followed by equalization hardware (which together can be thought of as a super-demodulator). The equalization hardware comprises an adaptive filter 280 that is interposed between demodulator 210 and slicer 220. The operational characteristics of filter 280 are controlled by filter coefficients that are stored—in modifiable form—within tap update block 290. Tap update block 290 is responsive to the output signals of subtractors 250 and 260. The adaptation of filter 280 is carried out in accordance with conventional modem techniques. The outputs of subtractors 250 and 260 are also applied to demultiplexer 275 and the outputs of demultiplexer 275 are applied to de-mapper 276. De-mapper 276 comprises a bank of de-mappers 270 of FIG. 10. Elements 275 and 276 are included to illustrate a receiver that is adapted for applications where a plurality of analog inputs are multiplexed. Of course, in applications where there is no multiplexing, de-mapper 270 can be substituted.

In accordance with some adaptation approaches, it is easiest to carry out adaptation and the corresponding coefficient updates when the power in the analog signal is small. To limit the process to such intervals, FIG. 11 includes a power detector within control element 295 that is responsive to subtractors 250 and 260. Block 295 is also conventional. It includes a power detection circuit that evaluates the power contained in the signals of subtractors 250 and 260 and delivers a control signal to block 290 to enable (or disable) the coefficient updating process. Of course, block 295 may be more generic, in that the control signal can be derived from other than the analog signal, such as from side information from the transmitter.

FIG. 11 depicts one arrangement for effecting equalization of the transmission channel between a sending modem's transmitter section and a receiving modem's receiver section; to wit, at the receiver's front end, following the demodulator. However, it is well known that equalization can be performed anywhere along the channel, going back even to within a modem's transmitter section.

Figure 12:
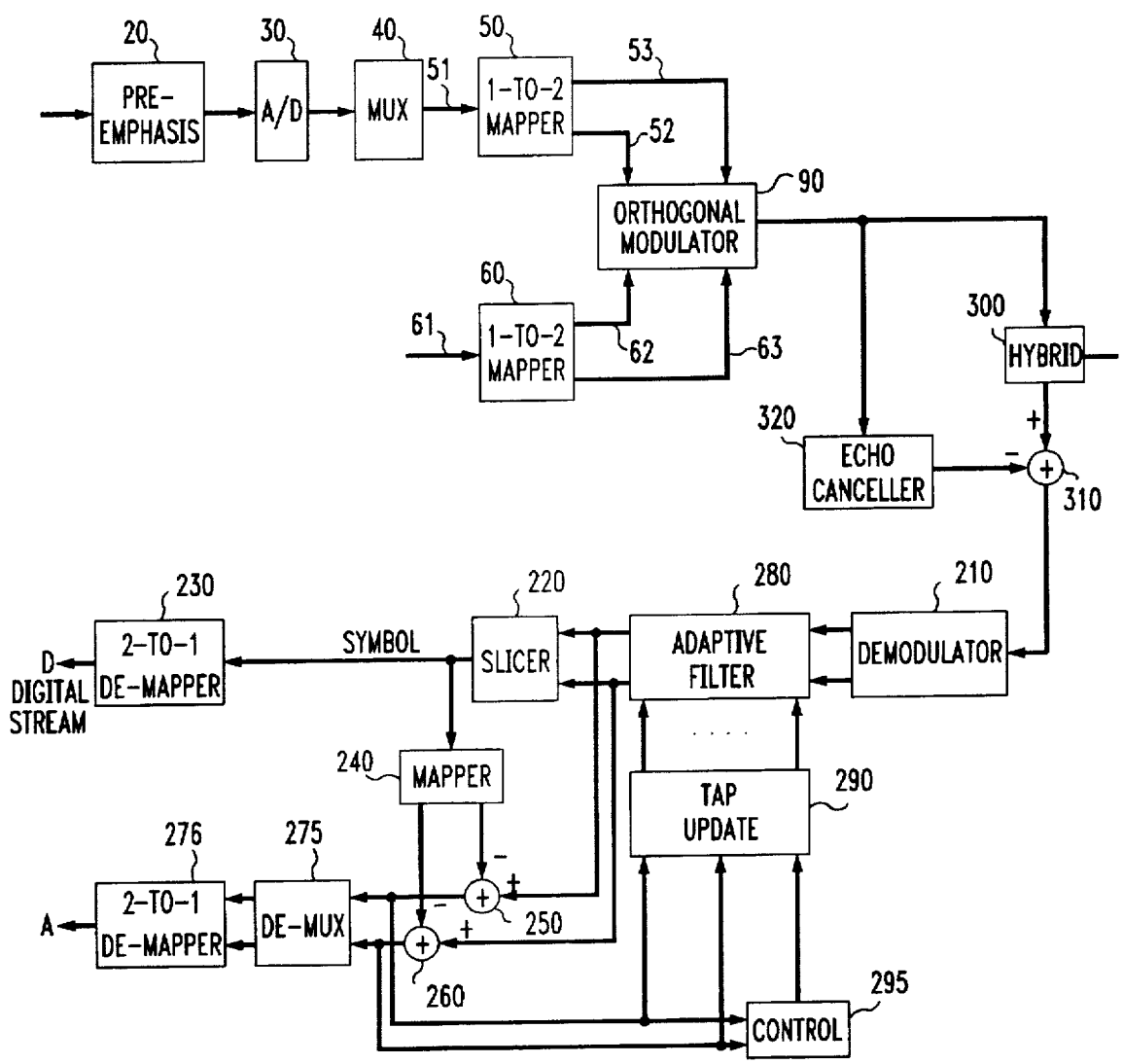
FIG. 12 presents the block diagram of an entire modem.

FIG. 12 depicts the entire, full duplex, modem constructed in accordance with the depictions of FIGS. 9 and 11. More specifically, a transmitter section (FIG. 9) is coupled with a receiver section (FIG. 11) through hybrid 300 and subtractor 310. Subtractor 310 cooperates with echo canceller 320 in the conventional way to subtract unwanted signals from the signal applied to demodulator 210. For sake of simplicity, echo canceller 320 is shown to connected to the output of orthogonal modulator 90, and in analog embodiments of element 320 this is perfectly satisfactory. However, in digital embodiments it is well known that efficiencies can be realized by having the echo canceller be responsive to the outputs of mapper 60, where the signal rate is much lower.

Figure 13:
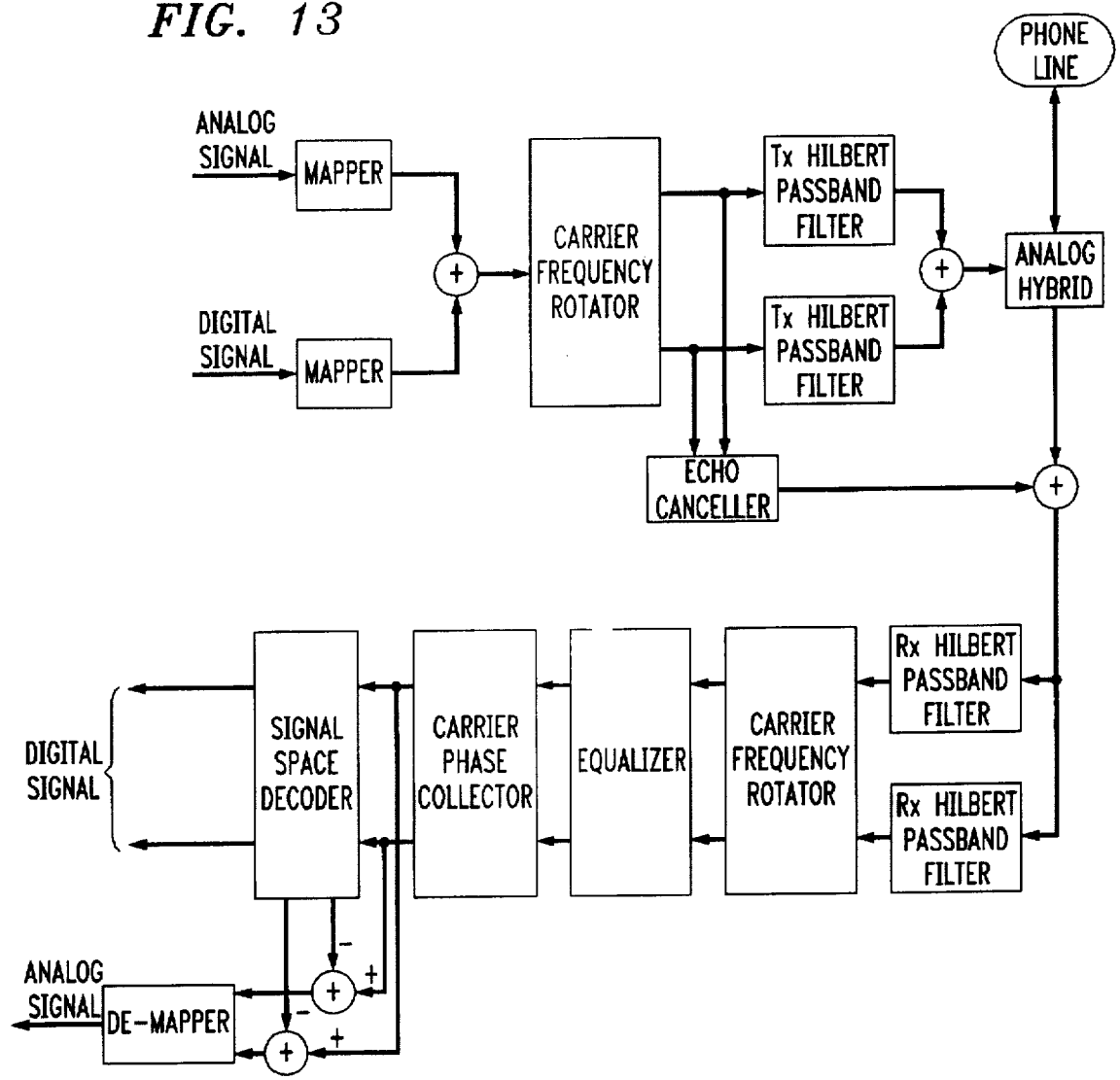
FIG. 13 presents a slightly different embodiment of the FIG. 12 modem.

An improvement which incorporates the principles disclosed herein is shown in FIG. 13. It may be noted that some of the elements in FIG. 13 are designated by different labels; such as "Hilbert passband filter", which corresponds to a modulator, etc. These are circuits that attain the desired results through somewhat different calculations and are well known to persons skilled in the modem art.

The echo canceling is performed, as in all modems, during a training period, when the far end signal source is silent and the echo canceller is adapted to minimize the output of subtractor 310.

Figure 14:
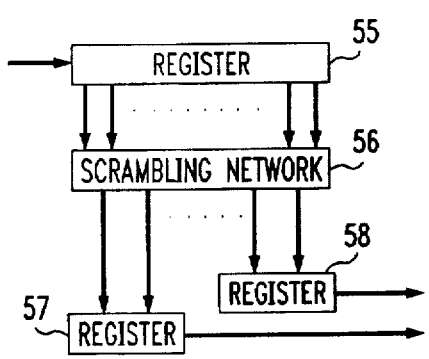
FIG. 14 depicts one structure for scrambling analog samples.

In connection with FIG. 6 it has been disclosed that the input to element 50 can be a sampled analog signal, as well as an unsampled analog signal. It has also been disclosed above that when element 50 is a 1to-2 mapper (as compared to 1-to-N mapper) and the desired output of element 50 is pairs of a sampled analog signal, the pairs of analog samples can be derived by simply delaying the incoming analog signal by 1/B and sampling both the delayed and the undelayed versions at rate B. This provides sample pairs that correspond to adjacent samples of the original analog signal sampled at rate ½B seconds. Actually, privacy of the communication is enhanced when the samples are not adjacent, and FIG. 14 presents one approach for deriving pairs from non-adjacent samples. It basically includes an input register 55 for storing K analog samples that arrive at rate 2B, a scrambling network 56 that scrambles the outputs of register 55 and develops K outputs, and registers 57 and 58 that are responsive to the outputs of network 56. Registers 57 and 58 store K/2 analog samples every K/2B seconds and output the stored samples at rate ½B seconds. Scrambling network 56 may be simply a cross-connect field.

Figure 15:
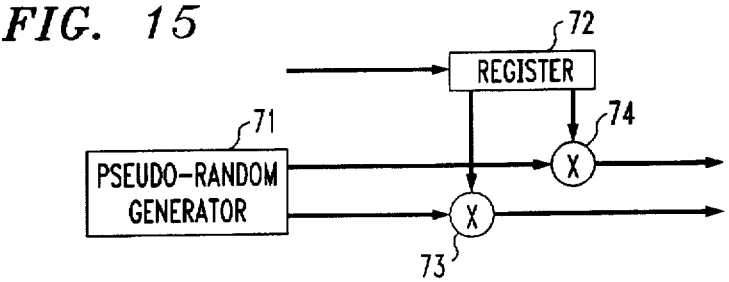
FIG. 15 presents a block diagram of a privacy scrambler employing pseudo-random multiplication of the analog samples.

Another approach for enhancing privacy entails modifying the gain and phase of the analog signals that are sent. This is akin to operating on, or transforming, the signal components that form the signal vector which is added to the constellation symbols. The transforming may be in accordance with the signal characteristics, or it may simply be following a pseudo-random sequence. The latter is depicted in FIG. 15, where register 72 receives analog signal sample pairs and directs each member of a pair to a different multiplier (73 and 74). Multipliers 73 and 74 modify the applied signal samples in accordance with corresponding coefficients that are received from pseudo-random generator 71, resulting in a pair of modified signal samples that are applied to mapper 50. Additional teachings of this technique are found in U.S. Pat. No. 4,124,516, issued May 8, 1990, to G. Bremer and W. Bens.

Of course, the receiver ought to include a pseudo-random generator that is synchronized to generator 71 in order to properly decode the analog signal. The FIG. 15 circuit can be incorporated in a receiver (such as the FIG. 11 receiver) within the de-mapper that develops the analog signal. Synchronization of the FIG. 15 circuit in the receiver is achieved via synchronization information that is sent by the transmitter as "side information".

Figure 16:
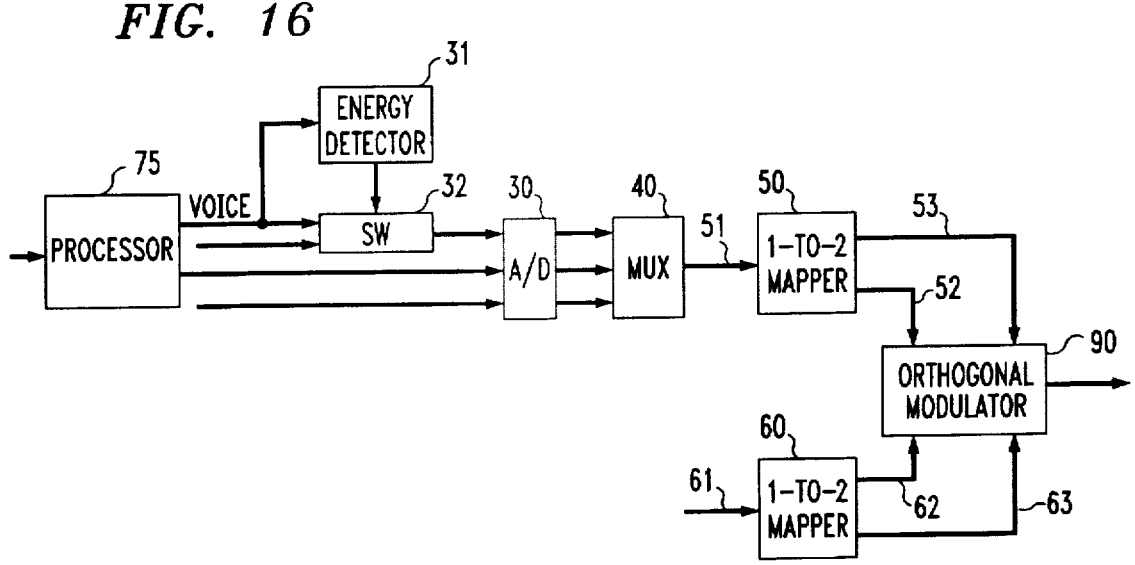
FIG. 16 illustrates a processor 75 being interposed between the analog input and the analog port of the modem, with the processor being adapted to carry out signal preprocessing functions, such as linear predictive coding.

Characterizing the enhancement more generally, modifying the input signal based on the input signal's characteristics is a general enhancement of the embodiments disclosed herein. The signal's amplitude, for example, can be dynamically modified to enhance the attainable signal to noise ratio. The dynamic scaling of the signal can be communicated to the receiver in the form of "side information" either on the digital channel, or on the analog channel (for example, via one of the channels described in connection with the FIG. 9 embodiment). This is depicted in FIG. 16, where signal processor 75 precedes switch 32. Processor 75 modifies the signal applied to switch 32 and also provides the aforementioned side information that is applied to A/D converter bank 30.

In may be noted in passing that some side information can also be included in the analog channel itself, by "stealing" some samples from the analog signal stream, of course, with some realizations that would create missing samples at the receiver, but interpolation techniques at the receiver can create close estimates of the missing samples.

Still another way to modify the signal is to control its dynamic range through automatic gain control (AGC) which may be effected in conventional ways.

Yet another way to modify the signal is to encode it, and that includes, for example, the entire field of predictive encoding.

In predictive coding, the object is to predict the present signal from past signals and to transmit only the error, or residue, signal; that is, the signal that represents the deviation of the true signal from the predicted signal. It is expected, of course, that with good prediction the residue signal will be small. An arrangement that creates only small residue signals allows the residue signals to be amplified (in a fixed manner or dynamically), achieving thereby good signal resolution and high noise immunity.

The residue signal sample, e(n), is typically developed by the calculation:

$$e(n)=x(n)-a_1x(n-1)-a_2x(n-2)-a_3x(n-3)$$

in response to input signal samples x(n), x(n−1), x(n−2), and for preselected coefficients $a_1$, $a_2$, $a_3$, . . . .

It may be noted that the number of coefficients is a designer's choice, and that the number of coefficients can also be a function of signal characteristics. For some signal characteristics the number of coefficients may be two, for others it may be three, etc. Also, the values of the coefficients may be fixed (and set in accordance with historical determinations) or variable, based on considerations such as short term history of the signal, the current number of symbols in the constellation, etc.

Processor 75 of FIG. 16 may be employed to perform the selected encoding. More specifically, processor 75 may perform the function of a linear prediction coefficient generator that is sensitive to the characteristics of the input signal, and also perform the function of the augmentation filter. The coefficients developed by the linear predictive coefficient generator portion of processor 75 delivers the coefficients as side information to the A/D converter block, to be transmitted to the receiver and used therein in accordance with the equation $$y(n)=e(n)+a_1y(n-1)+a_2y(n-2)+a_3y(n-3)$$

Figure 17:
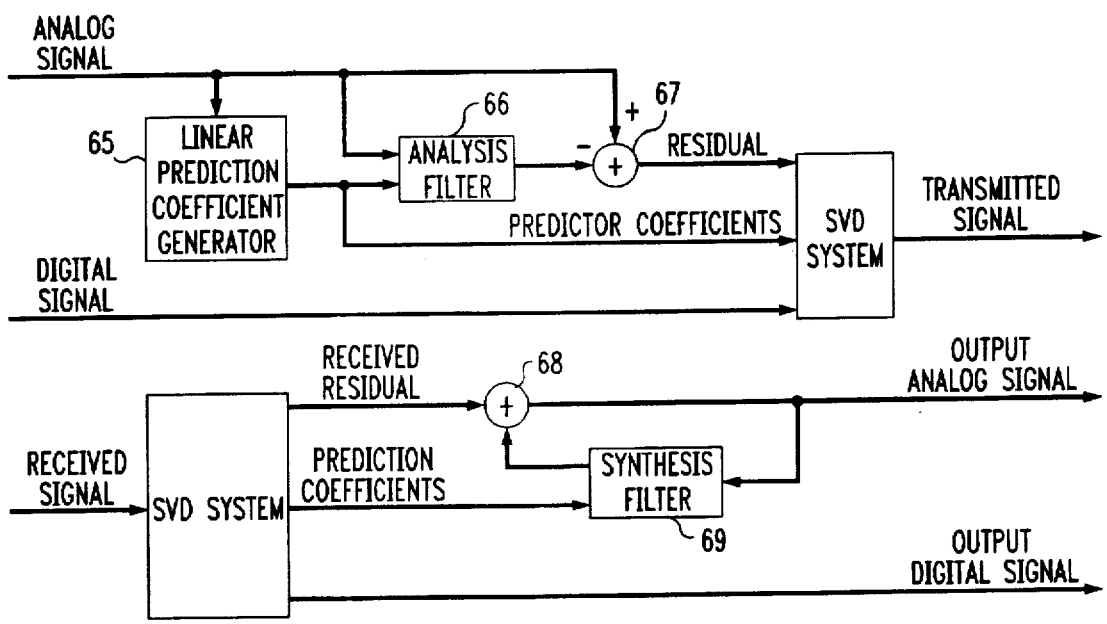
FIG. 17 presents a block diagram illustrating linear predictive coding.

FIG. 17 presents a block diagram of the transmitter and receiver portions that handle the linear predictive coding (elements 65-60). The blocks marked "SVD system" represent the receiver and transmitter portions of the modem embodiments (SVD modem) disclosed above (e.g. FIG. 13).

Yet another way to enhance operation is to employ pre-emphasis. For example, the "analog" input that enters orthogonal modulator 90 can be filtered to pre-emphasize the high frequencies and, correspondingly, the "analog" output of subtractors 250 and 260 can be filtered to remove the pre-emphasis. The pre-emphasis can be effected, for example, within the A/D converter 30 or even prior thereto, such as in pre-emphasis filter 20 shown in FIG. 12. The filtering can be done while the "analog" signal is truly analog, or it could be done when the "analog" signal is represented digitally—such as when the transmitter and receiver sections are implemented with digital hardware.

One aspect of the embodiments described above which employ a sampling process for the analog signal applied to mapper 50 is the limitation on the highest frequency that may be included in the applied signal in accordance with Nyquist's criteria. Stated in other words, regardless of the bandwidth offered by the communications network, a decision to sample the incoming signal at the symbol rate of mapper 60 places a limit on the upper frequency of the sampled signal. In some applications, such as in speech applications, it may be desirable to transmit higher frequency signals even if the cost of achieving that capability is a forgoing of some low frequencies.

This capability is realized by frequency shifting. That is, the speech signal is bandlimited, a preselected portion of the low frequency band is deleted, the resulting bandlimited signal is shifted downward, and the shifted signal is sampled.

These operations can be performed with conventional filtering and modulation circuitry or, alternatively, these operations can be performed with Hilbert filters. At the receiver, this process is reversed, of course.

A number of implementations described above require transmission of "side information" to the receiver. Also, as described above, this information can be sent on the analog channel or on the digital channel.

When the side information is sent on the digital data channel, it is embedded using DLE (Data Line Escape) shielding. More specifically, the side information is inserted in the data channel's bit stream while that channel's information is momentarily halted. In DLE shielding, the side information is preceded by a specific bit sequence known as the "command sequence", and may consist of either a fixed-length bit stream or a variable-length bit stream followed by a termination sequence. The command sequence indicates that the data to follow is side information and not main channel data.

Since any sequence of bits chosen for the command sequence could also appear in the customer data bit stream, a safeguard method is used to ensure that instances of the command sequence which do appear in customer data are not interpreted as true command sequences. In the transmitter, at the same point in the system where side information is embedded in the data stream, the input bit stream is monitored for instances of the command sequence in the customer data. At each point in the bit stream where an instance of the command sequence is detected, the transmitter inserts a duplicate sequence immediately following the original.

At the receiver, the input bit stream is again monitored for instances of the command sequence. If a command sequence is detected, the bit stream immediately following is checked for a duplicate instance of the same sequence. If such a duplicate is detected, indicating that the original sequence is in the customer data and not a true command flag, the receiver deletes the duplicate sequence from the data stream and continues monitoring. If, however, no duplicate is detected, the sequence is a true control flag. The receiver removes both the command sequence and the following side information from the main channel bit stream and routes the side information to its appropriate destination.

The method described above works regardless of how many instances of the command sequence are duplicated sequentially in the customer bit stream. Each instance is treated separately, with a duplicate instance inserted following the original. At the receiver, each pair of instances is treated separately, with the second in the pair discarded. As a result, if an even number of instances of the command sequence is detected following each other in the receiver, the output will consist of one half of the number of instances in the customer data stream and no side information. If an odd number n of instances is detected, the output will consist of (n-1)/2 instances in the output data stream and routing of side information in the receiver which is indicated by the last (unduplicated) command sequence.

Figure 18:
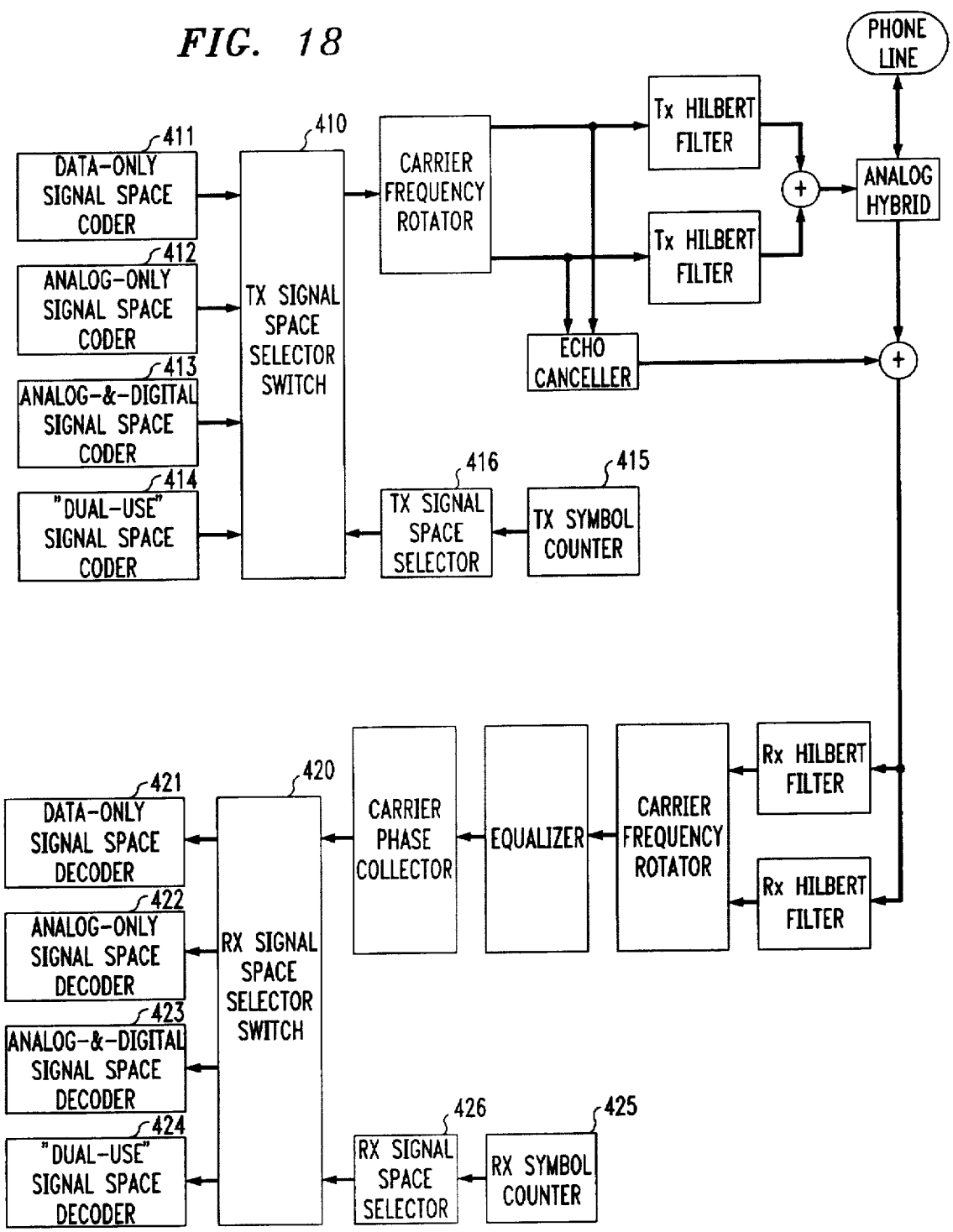
FIG. 18 presents a block diagram illustrating the alternative use of different signal spaces.

Having described a number of enhancements to the basic embodiments, it is clear that various novel combinations can be created to provide varied benefits. FIG. 18, for example, shows an arrangement where different signal spaces are employed at different times. The different signals spaces can be used at preselected times, or their use can be application dependent. The transmitter section of FIG. 18 includes a transmitter signal space selector switch 410, a data-only signal space coder 411, an analog-only signal space coder 412, an analog & data signal space coder 413, and a dual-use signal space coder 414. Correspondingly, the receiver section includes a receiver signal space selector switch 420, a data-only signal space decoder 421, an analog-only signal space decoder 422, an analog & data signal space decoder 423, and a dual-use-signal space decoder 424.

The data-only coder 411 corresponds to the FIG. 6 coder with no input at line 51. The analog-only coder 412 corresponds to the FIG. 6 coder with no input at line 61. The analog & digital coder 413 corresponds to the FIG. 6 coder as described above, and the dual-use coder 414 is a coder where the symbols of line 61 in FIG. 6 are applied to only one of the orthogonal modulators, and the signals of line 51 in FIG. 6 are applied only to the other of the orthogonal modulators.

As indicated above, the signals space changes can be planned apriori such as at predetermined symbol times (e.g., with symbol counter 415 and selector 416). One might wish to send data only alternated with analog only, with the timing ratio being completely at option of the user. Alternatively, one may signal the beginning of a specific signal space mode, and signal again when that mode changes. The signal spaces need not be the same in the two communication directions. All such signaling is effected through "hand shaking" protocols between the communicating modems; which in the example shown in FIG. 16, is merely a synchronization between TX Symbol counter 416 and RX Symbol Counter 426.

The issue of sending side information has generally been discussed above, but it may be useful to also address a specific case of "side information": establishing and dismantling a connection.

Figure 19:
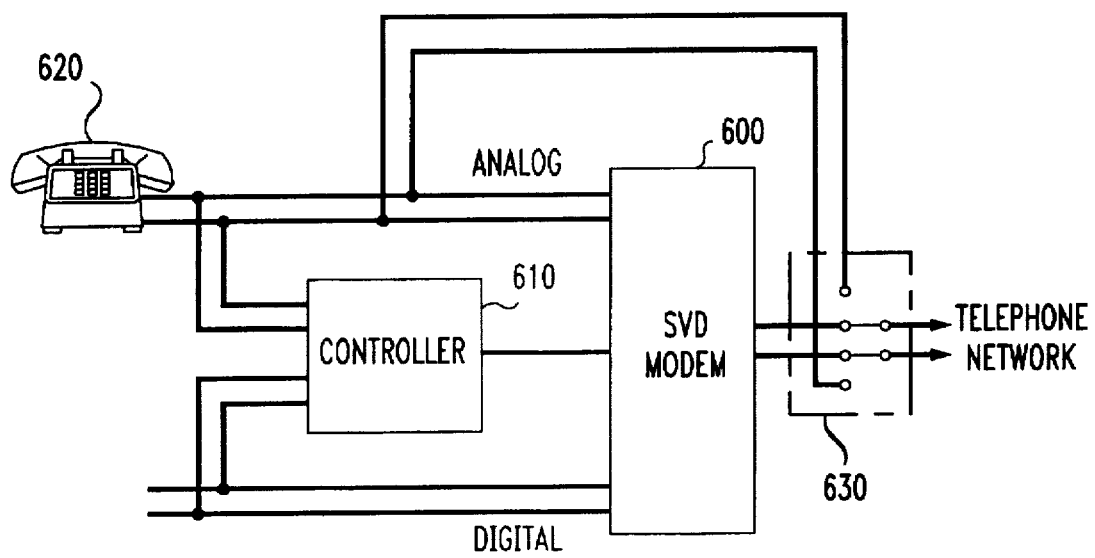
FIG. 19 presents a block diagram that includes the disclosed modem and means for bypassing the modem when it is inoperative.

In applications where a conventional telephone is connected to the analog port, the question is how will the connection be established and dismantled. FIG. 19 illustrates the arrangement for accomplishing these tasks, with a controller 610 that is connected to a modem 600.

As disclosed above, most current modem implement the necessary function in a processor that is under influence of stored program control. That is, the functions are implemented by programs that operate on numbers representing signals and ultimately develop the called-for signals. In such realizations, controller 610 is arranged to interrupt the normal program flow in modem 600 whenever the right conditions occur.

Thus, when telephone 620 goes "off hook", controller 610 senses the condition and forwards an interrupt to the microprocessor within modem 600. Modem 600 then goes into a "control mode" which reads the instructions provided to modem 600 by controller 610. When controller 610 specifies an "off hook" condition, modem 600 is reconfigured to pass through the signals arriving at the analog port directly to the telephone network. This can be accomplished in modem 600 by providing a separate signal path that is enabled, or by conditioning the various elements in the signal path to the same end results. When telephone 620 is thus connected, dial tones can then flow to the telephone central office and establish a connection.

When a connection is established to a far end customer, modem 600 sends a tone, identifying itself as a) a modem and b) an svd modem. Once a connection to the far end equipment is established and the far end equipment identifies itself as an svd modem, then modem 600 assumes its svd modem architecture. If the far end equipment identifies itself as a non-svd modem, then modem 600 can establish itself as a conventional modem connecting its digital port to the far end equipment. Lastly, if the far end equipment is identified (by default) as a conventional telephone, modem 600 remains in its "short circuited" mode.

Dismantling a connection is at least as easy. An "on hook" condition is detected by controller 610 and, if there is no "conversation" established on the data side, controller 610 signals modem 600 to turn itself off.

The "off hook" and "on hook" signaling described above is just illustrative. Other signaling can, of course, be used. For example, on the analog side, controller 610 can be responsive to touch tone sequence, included the "#" and the "*" tones. On the digital side, the DLE shielding signaling can be employed. In this manner, once only a digital path is maintained, the digital signal source can effect a "disconnect".

The above disclosure addresses the issue of initial connection, but the same principle applies to other control of the disclosed modem. More specifically, controller 610 is able to detect a hook-flash—which is a momentary "off hook" condition that is not long enough to be detected by a telephone central office as a "disconnect" signal—, and in response to the hook flash controller 610 places the associated modem into a control state. Once in the control state, modem 600 interprets DTMF signals from the telephone instrument as control signals. At the pleasure of the designer, the signals from the analog port of modem 600 can also be interpreted as control signals. Alternatively, to the extent it makes sense, the normal transmission of the digital channel signals can proceed.

FIG. 19 also depicts an enhancement for a modem failure mode. This enhancement would advantageously be incorporated in all uses of the disclosed modem where connection to a telephone function is desired even in the absence of local power. Specifically, FIG. 19 includes a pair of leads from the analog side of the modem to a pair of relay contacts 630. Relay contacts 630 are arranged to connect the telephone network leads to the telephone network port of modem 600 when modem 600 is operational, or to the analog port of modem 600, otherwise. The relay coil that operates contacts 630 (not shown) may simply be responsive to the leads that power modem 600, or to a "status OK" output lead of the modem.

Summarizing the controls available, the following conditions may exist: a) data communication is established first, then voice communication. b) voice communication is established first, then data communication.

Data communication may be established first. When that occurs, the near end SVD modem informs the far end modem that it is an SVD modem, and if the far end modem is also an SVD modem, the communication path is established. When the far end modem fails to identify itself and an SVD modem within a predetermined time interval (by responding with the appropriate tone), the near end SVD modem assumes that the far end modem cannot comply because it is not and SVD modem, and the near-end modem reverts to the conventional modem architecture—if it had been in the SVD mode—, or remains in the conventional modem architecture—if it had not been in the SVD mode.

When the far-end modem is an SVD modem and the digital communication is established, voice communication can be set up at will. All that is required is for the parties at the two ends to pick up their handsets and start conversing. To accomplish that, an alert signal may need to be sent by the party that wishes to initiate the voice conversation. To that end, the controller (e.g., 610) sends an alerting tone to the alerted modem, and that tone is recognized by the receiving modem's controller. In response thereto, the controller at the far-end modem applies an alert tone (such as a ring signal) to the telephone at the alerted location.

Either or both modes of communication can be dropped at will. When any one of the communication paths is abandoned, the controller needs to do nothing. Only when both communication paths have been abandoned, the controller needs to be involved; at which event the connection to the telephone central office is dropped.

When a voice call is initiated first, the initiating modem need not know whether the responding modem and an SVD modem. Indeed, anticipating that many receiving modem might not be SVD modems, controller 610 is likely to be set in a manner that presets the modem to a conventional architecture, and initiates the call accordingly.

When a data path is sought to be established, the first test must be whether the responding modem is an SVD modem. This determination is carried out by the SVD modem via a transmitted control sequence, as described above, to the responding modem. If the return signal is that the responding modem is not an SVD modem, then the data connection is not effected. On the other hand, if the return signal indicates that the responding modem is an SVD modem, then the initiating modem sends a command sequence to the responding modem, directing it to assume its SVD architecture. When that happens, the initiating modem also assumed its SVD architecture, the normal protocol between two digital communication points is effected, and digital communication commences.

What is claimed is:

1. In a system including a signal space mapper followed by a modulator, where a digital input symbol in a stream of digital input symbol applied to the system is assigned to a constellation point in N-dimension space, N being an integer greater than 1, and where the modulator modulates the constellation point with N mutually orthogonal carrier signals, the improvement comprising:

an analog port included in the mapper for accepting a group of N mutually exclusive, correlated, analog signal samples, and said mapper including circuitry for altering the constellation point assignment for the digital input symbol in response to the group of N analog signal samples including control means responsive to the stream of digital input symbols for detecting control signals.

2. The system of claim 1 including control means responsive to the stream of digital input symbols for detecting control signals using Data Line Escape (DLE) shielding.

3. In a system including a signal space mapper followed by a modulator, where a digital input symbol in a stream of digital input symbols applied to the system is assigned to a constellation point in N-dimension space, N being an integer greater than 1, and where the modulator modulates the constellation point with N mutually orthogonal carrier signals, the improvement comprising:

an analog port included in the mapper for accepting a group of N mutually exclusive; correlated, analog signal samples, and said mapper including circuitry for altering the constellation point assignment for the digital input symbol in response to the group of N analog signal samples further comprising controller means coupled to the analog port for detecting control signals supplied to the analog port and for applying control signals to the system.

4. The system of claim 3 wherein said controller means detects of a condition of a telephone instrument connected to the analog port.

5. The system of claim 3 wherein said controller means detects predetermined touch tone signal sequences.

6. The system of claim 3 wherein said controller is further coupled to the stream of digital input symbols for detecting control signals appearing in said stream of digital input symbols.

7. The system of claim 3 wherein said controller means detects hook flash condition of a telephone instrument connected to the analog port.

8. The system of claim 3 wherein said controller means detects hook flash condition of a telephone instrument connected to the analog port and places the system in a control state.

9. The system of claim 8 wherein said controller interprets DTMF signals from the telephone instrument as modem control signals when the system is in the control state.

* * * * *

UNITED STATES PATENT AND TRADEMARK OFFICE
CERTIFICATE OF CORRECTION

PATENT NO.   : 5,537,441
DATED        : July 16, 1996
INVENTOR(S)  : Gordon Bremer, et al.

It is certified that error appears in the above-identified patent and that said Letters Patent is hereby corrected as shown below:

Column 3,
Line 32, after "the", delete "word" and replace with -- or --.

Title page,
Item [21] delete "67,519" and replace with -- 76,519 --

Signed and Sealed this

Eighteenth Day of September, 2001

Attest:

NICHOLAS P. GODICI
Attesting Officer    Acting Director of the United States Patent and Trademark Office